July 10, 1951 S. A. DENMAN 2,559,602
VIBRATORY MOTOR
Filed Jan. 21, 1948
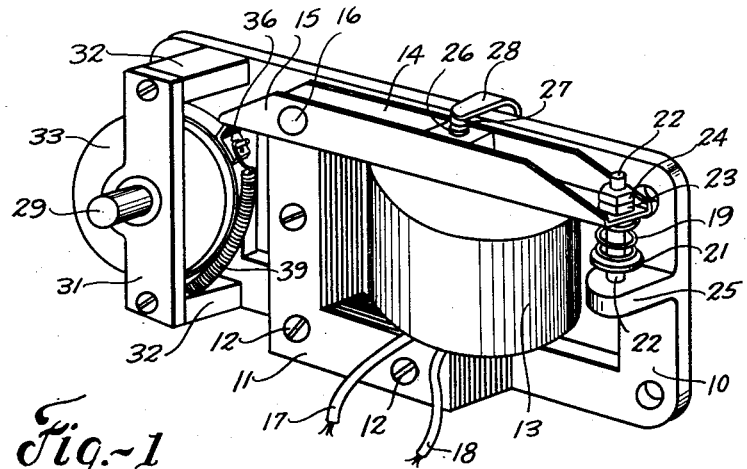
Fig.-1
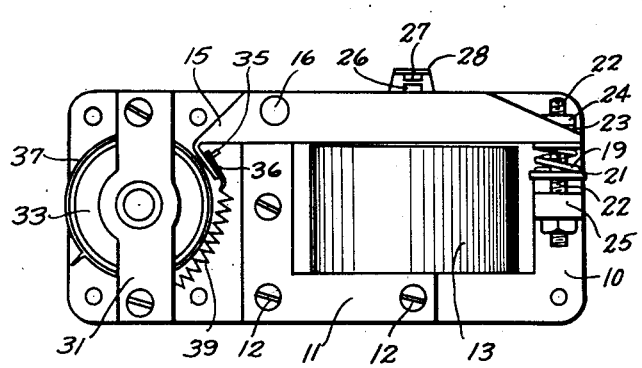
Fig.-2
Fig.-3
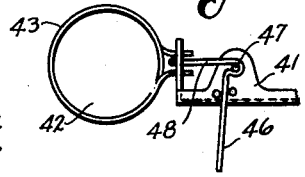
Fig.-4
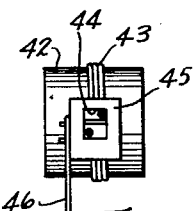
Fig.-5
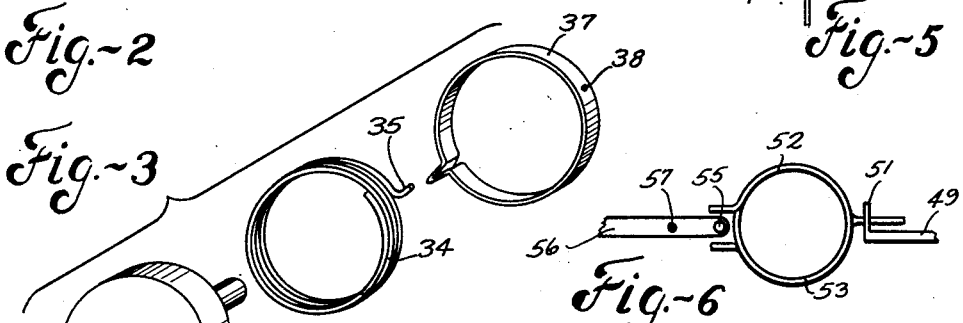
Fig.-6
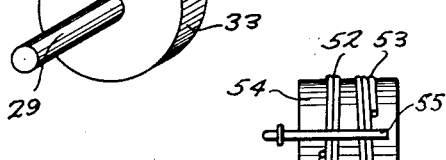
Fig.-7
Inventor
Stephen A. Denman
Tom Walker
Attorney Patented July 10, 1951

2,559,602

UNITED STATES PATENT OFFICE 2,559,602

VIBRATORY MOTOR

Stephen A. Denman, Piqua, Ohio, assignor to Piqua Engineering, Inc., Piqua, Ohio, a corporation of Ohio Application January 21, 1948, Serial No. 3,589

9 Claims. (Cl. 172—126)

This invention relates to electric motors, and more particularly to vibratory motors.

There has long been a need and a demand for an efficient but simple motor of the present type. It is particularly adapted for use in connection with motorized toys, games, and industrial applications where a relatively slow speed, constant high torque motor is required. Heretofore such applications have been satisfied by using small shading ring or synchronous type motors in connection with a gear reduction unit. Not only have such units become relatively high priced, but the efficiency thereof is greatly reduced by use of the gear reduction unit. The instant construction results in a motor which not only is considerably more efficient, but is more powerful and more economical to build.

The object of the present invention therefore is to improve the construction as well as the means and mode of operation of electric motors, whereby they may not only be economically manufactured and operated, but will be more efficient in use, uniform in operation, having few operating parts and be unlikely to get out of repair.

A further object of the invention is to obtain an electric motor of such simple, economical construction as to be adaptable for use in toys, games or the like, and which is yet of sufficiently rugged and powerful design as to permit general commercial use thereof.

Another object of the invention is to adapt a vibratory electric motor for rotary drive of an output shaft through a step-by-step advancement thereof.

A further object of the invention is to embody the feature of reversibility in a vibratory motor adapted to turn a rotor.

A further object of the invention is to provide an electric motor having the advantageous structural features and the inherent meritorious characteristics herein described.

With the above primary and other incidental objects in view as will more fully appear in the specification, the invention intended to be protected by Letters Patent consists of the features of construction, the parts and combinations thereof, and the mode of operation or their equivalents, as hereinafter described or illustrated in the accompanying drawings.

In carrying out the above objects there has been conceived a concrete embodiment of the invention, comprising vibratory motor elements including a coil and a stator, and an armature which oscillates in response to the intermittent energizing of the coil, and further comprising a rotor wheel peripherally mounting a coil spring which is so arranged and connected to the armature as to oscillate with the armature and in one direction of movement thereof to tighten upon and to turn the rotor wheel. Through the provision of special or duplicate springs and suitable control means, the motion of the armature may be selectively applied to the rotor wheel to obtain reversibility.

In the accompanying drawings, wherein is shown the preferred but obviously not necessarily the only form of embodiment of the invention, there is illustrated in Fig. 1 a perspective of an electric motor constructed in accordance with the present invention;

Fig. 2 is a view in side elevation of the motor of Fig. 1;

Fig. 3 is an exploded view in perspective of the rotor assembly;

Figs. 4 and 5 are fregmentary views showing a modification of the motor adapting it for reversible operation; and Figs. 6 and 7 are views similar to Figs. 4 and 5 showing a second form of reversible rotor assembly.

Referring to the drawings, an electric motor constructed in accordance with the illustrated embodiment of the invention comprises a metal plate 10 forming the motor base or support. On one side of the base 10 is a stator 11 made up of stacked laminations secured to each other and to the base 10 by screws 12. The stator 11 has mounted thereon a coil 13 made up of multiple turns of magnetic wire and so positioned on the stator and suitably insulated therefrom as to introduce magnetic lines of force in the stator when the coil is energized by an electric current. Positioned above the stator 11 and coil 13 is an armature 14 secured to and pivotally carried by a stud 16 set in the base 10. The armature extends in the opposite direction past the stud 16 forming a projecting level 15 through which power is delivered to the rotor.

Coil 13 is in an electrical circuit including conductors 17 and 18. Intermittent energizing of the coil 13 results in an intermittent attraction of the armature 14 toward coil 13 and stator 11. The armature 14 is urged in the opposite direction by spring 19 against the yielding resistance of which the armature is attracted by the coil 13. Such movement produces a continually oscillating motion of the armature 14 and level 15 about pivot stud 16.

The spring 19 is interposed between the lower surface of armature 14 and a shoulder 21 integral with a screw stud 22. Above and below the shoulder 21, the stud 22 is screw threaded. Above shoulder 21 the stud is passed loosely through the armature 14, above which a rubber bumper 23 and a lock nut 24 are mounted thereon. Below shoulder 21 the stud is in threaded engagement with an ear 25 projecting laterally from body plate 10. By adjustment of the lock nut 24 along said screw stud 22 the tension of spring 19 and the amplitude of movement of armature 14 may be varied.

When the electric motor is used in connection with an alternating current supply, mechanical means for obtaining intermittent energizing of the coil 13 is unnecessary. In the case of a direct current supply, it is necessary, however, that the current be interrupted to obtain the vibratory oscillation of armature 14 and lever 15. The use of various standard types of circuit interrupters are possible. One such device is shown in the drawings, comprising an electrical contact 26 carried by armature 14, while a mating contact 27 is supported on an arm 28 fastened to the base 10. The contacts are connected in the energizing circuit for the coil 13 and in series therewith. Thus, when spring 19 returns armature 14 upward, contacts 26 and 27 are engaged to close the electrical circuit through coil 13. The coil, accordingly, is energized to attract armature 14, which moves toward the coil against the yielding resistance of spring 19. Such motion disengages the contacts 26 and 27 and opens the circuit through coil 13. Responsive thereto, the coil is deenergized and the armature 14 is again moved upward by the action of spring 19 to repeat the above sequence of operations.

In any event, and whether the motor is used in connection with an alternating current source or a direct current source, the effect is one of intermittent energizing of the coil 13, thereby producing a vibratory oscillating motion of armature 14 and lever 15 about pivot 16.

The end of base 10 opposite that embodying ear 25 provides a bearing for a rotor shaft 29. One end of the shaft 29 is mounted in base 10, while the opposite end of the shaft is mounted in a plate 31 spaced from the base 10 by spacer blocks 32. Integral with or otherwise fixed to the rotor shaft 29 is a rotor wheel 33, the rotor assembly being so arranged as to place the wheel 33 between plate 31 and base 10. As so positioned, the wheel 33 is approximately in line with the lever 15 and in part underlies the end of such lever projecting beyond pivot stud 16.

Mounted on wheel 33 in peripheral surrounding relation thereto, is a coil spring 34. One end of the spring 34 parallels the several coils thereof and lies on the surface of the wheel 33. The other end 35 of the spring is turned outward and passed through an opening in a lug 36 dependent from the adjacent end of lever 15. The coil spring 34, accordingly, is connected to lever 15 and armature 14 and partakes of the oscillating action of these parts.

The arrangement is such that motion of the lever 15 in a clockwise direction (as viewed in Fig. 2) about the pivot stud 16 serves to move the lug 36 upward to impart a winding impulse to the spring 34, which during the initial movement of the lever 15 tightens the spring upon wheel 33. Continued motion of the lever 15 and lug 36 in the same direction is transmitted through spring 34 into a turning motion of wheel 33 and its shaft 29. Accordingly, the wheel 33 and shaft 29 are advanced an increment of movement each time coil 13 is energized to attract armature 14. In the period that coil 13 is deenergized, lever 15 is moved by spring 19 in a counter-clockwise direction about stud 16. This motion produces, first, a loosening of the spring 34 upon wheel 33 and then a sliding motion of the spring relative to the wheel 33 back to its starting position. Such friction as there may be between the coil spring 34 and wheel 33 during this return movement is not enough to overcome the inertia of the wheel and the friction of shaft 29 in its bearings. Thus, for each to and fro stroke of the armature 14 and lever 15, occasioned by the energizing and deenergizing of coil 13, wheel 33 and rotor shaft 29 are advanced an increment of motion. The rapidity of the vibrations of lever 15 is such that the advancement of the motor shaft 29 is a substantially continuous motion of rotation in one direction.

The coil spring 34 may in some instances be subject to backlashing when it expands during the return stroke of lever 15. As a guard against such action and to limit expansion of the spring, there may be provided a keeper 37 in the form of a metal ring arranged to surround spring 34 upon wheel 33. An opening 38 in keeper 37 permits the passage of spring end 35 therethrough.

There is a further possibility that wear may result in some lost motion between the spring end 35 and lug 36. As a guard against such lost motion, there may further be provided a spring 39 connected at one end to the spring end 35 and at its other end to one of the spacer blocks 32. The spring 39 acts to maintain spring end 35 in contact with one side of the opening in lug 36 through which the spring end is passed. No opportunity thus is afforded for this opening to become enlarged through wear, resulting in lost motion between the spring end and the lever 15.

The speed of rotation of shaft 29 is a function of several factors. These include the frequency of movement of lever 15, the amplitude of movement of lever 15, the diameter of wheel 33, and the amount of lost motion between the various moving parts. The torque developed by shaft 29 is a function of the strength of the magnetic field set up in stator 11.

The motor shown in Figs. 1 to 3 and described above is of the unidirectional type. That is, the shaft 29 may be and is driven in only one direction. A reverse drive of the output shaft of the motor is also contemplated by the present invention.

The reversible motor may take a number of forms, one of which is here illustrated in Figs. 4 and 5, and another of which is here shown in Figs. 6 and 7. Referring to Figs. 4 and 5, a fragment of a lever arm 41 is shown, corresponding to the lever 15 of Figs. 1 to 3. Adjacent to and in alignment with lever 41 is a rotor wheel 42, corresponding to rotor wheel 33 of Figs. 1 to 3. Surrounding wheel 42 is a coil spring 43 which is similar to spring 34 of Figs. 1 to 3 except that in this instance the opposite ends of the spring project in spaced parallel relation toward lever 41. The ends of spring 43 extend through a rectangular opening 44 in an upstanding lug 45 on the end of lever 41. The spaced relation of the ends of spring 43 is such that the spring ends lie respectively adjacent opposite ends of opening 44. Accordingly, when the lug 45 oscillates in accompaniment with the lever 41, the spring 43 tends to move to and fro on the wheel 42. Provision is made for selectively anchoring the ends of spring 43 relatively to lever 41 in such way that motion of the lever 41 in one direction or the other will serve to tighten spring 43 upon wheel 42 and to turn the wheel. The selective anchoring means is represented by a lever 46 pivotally mounted at 47 to the lever 41 and including a forwardly projecting arm 48 extending laterally between the spaced ends of spring 43. The lever 47 is shiftable by hand to positions adjacent to or in contact with selected ends of the spring 43 whereby to link the spring end so confined with lever 41. The selected spring end thus corresponds to spring end 35 of Figs. 1 to 3. It will be understood that in shifting arm 48 from cooperative relation with one end of spring 43 to the other, the stroke of lever 41 during which the spring is tightened upon wheel 42 is reversed, and, accordingly, the direction of rotation of the wheel is reversed.

The second form of reversing mechanism is shown in Figs. 6 and 7. As shown therein, an armature carrying lever 49 is formed with an upstanding lug 51 receiving the free ends of a pair of coiled springs 52 and 53 surrounding a rotor wheel 54. The springs 52 and 53 are reversely wound upon wheel 54 and the inner ends thereof lie adjacent one another in projecting parallel relationship at a point diametrically opposite the outer free ends received in lug 51. Positioned between the inner ends of springs 52 and 53 is a stud 55 projecting laterally from the end of a lever 56 pivoted at 57. The lever 56 is movable by hand about the pivot 57 to cause stud 55 selectively to engage the ends of springs 52 and 53. When so engaged by the stud 55 the selected spring 52 or 53 is prevented from assuming a gripping contact with the wheel 54. Accordingly, the spring 52 or 53 not engaged by stud 55 is effective to turn wheel 52. Thus, by selective adjustment of lever 56 either spring 52 or 53 may be made ineffective and the direction of rotation of wheel 54 so determined.

Motors of the present type are admirably suited for use in connection with toys, such as construction sets, trains, and other types of self-propelled toy vehicles. A wide range of use of such motors is also possible since they may be adapted for use with flashlight batteries, dry cells, transformers, rectifiers, or line voltage by a simple change in the characteristics of the coil 13, and adjustment of the return spring 19. They have also been found particularly useful in connection with coin operated machines, since they have relatively few parts, and are unlikely to get out of repair.

One of the biggest advantages of the present motors is the economy and simplicity of construction. Use of expensive gear reduction units, as is done in connection with the normal shading ring or induction motors, is completely eliminated while producing a more efficient motor. Furthermore, motors of the present type have been found to produce a greater torque or driving power for the amount of power supplied thereto. If complete quietness is a prerequisite for a particular application, the present motor may be completely submerged in oil or other sound deadening fluid and sealed therein without in any way impairing its operation.

From the above description it will be apparent that there is thus provided a device of the character described possessing the particular features of disadvantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An electric motor, comprising a coil, a stator, an armature movable in forward and reverse directions relatively to said coil and said stator in response to the energizing and deenergizing of said coil, a rotor and an inherently resilient spring freely coiled on said rotor one end only of the spring being connected to said armature, said spring tightening on said rotor and turning said rotor during motion of the armature in one direction and loosening and sliding on said rotor during motion of the armature in the opposite direction.

2. An electric motor, comprising a coil, an armature oscillating relatively to said coil in response to the energizing and deenergizing thereof, adjustable spring means at one end of said armature for regulating the amplitude of the movement thereof, a rotor adjacent the opposite end of said armature, and a coil spring wound on said rotor having one end connected to the said opposite end of said armature, the opposite end of said coil spring freely resting upon the periphery of said rotor, the construction and arrangement of parts being such that oscillating motion of said armature alternately tightens and loosens said coil spring upon said rotor, continued motion of said armature in a direction to tighten said spring acting through said spring to turn said rotor.

3. An electric motor according to claim 2, characterized by a band surrounding said coil spring to limit the expansion or loosening thereof.

4. An electric motor comprising a coil, a stator, an armature oscillating relatively to said coil and said stator in response to the energizing and deenergizing of said coil, a rotor, and means freely wound upon said rotor, one end of said means being connected to said armature for moving said rotor in step-by-step fashion in response to the movement of the armature the other end of said means being freely supported upon the periphery of the rotor.

5. An electric motor, comprising a body, a coil supported by said body, a stator supported by said body in operative relation to said coil, an armature movable toward and away from said coil in response to the energizing and deenergizing thereof, a lever carrying said armature and pivotally connected to said body for oscillating movement in response to the induced motion of said armature, means defining a rotor bearing in said body adjacent one end of said lever, a rotor mounted in said bearing, and a coil spring having a free end surrounding said rotor the other end of the spring being connected to the adjacent end of said lever, motion of said lever in one direction serving first to tighten said spring upon said rotor and then to impart to said rotor through said spring a turning movement limited in accordance with the extent of continued motion of said lever in said one direction, and motion of said lever in the opposite direction serving first to loosen said spring and then to turn said spring in a reverse direction relatively to said rotor.

6. An electric motor according to claim 5, characterized by resilient means associated with that end of said spring connected to said lever for maintaining said spring in tensioned engagement with the lever.

7. An electric motor including a coil, an armature oscillating relatively to said coil in response to the energizing and deenergizing of said coil, a rotor, a pair of coil springs reversely wound on said rotor and having respective outer ends operatively connected to said armature whereby motion of said armature in opposite directions serves to tighten respective springs on said rotor and to turn said rotor, and means for selectively springing the inner ends of said coil springs from gripping engagement with said rotor whereby to render one of said springs ineffective and thus to select a direction of rotation for said rotor.

8. An electric motor of the vibratory type, including an oscillatory power member, means for successively moving said member in opposite directions of oscillatory movement comprising an intermittently energized electromagnet capable of moving said member in one direction, a return spring against the yielding resistance of which said member is moved under influence of the electromagnet and under the resilient pressure of which the member is moved in the opposite direction, a rotor shaft comprising the output shaft of the motor, an inherently tensioned resilient connection between the oscillatory power member and the rotor shaft, the construction and arrangement being such that movement of the power member in one direction increases the tension thereby moving the rotor shaft in synchronism with the power member, and movement of the power member in the opposite direction decreases the tension thereby permitting movement of the power member independently of the rotor shaft, tension regulating means by which the rotor shaft may be interconnected with the power member for synchronous movement therewith in either direction of oscillation, and means for retaining the tension in said resilient connection at a predetermined minimum.

9. An electric motor having a coil, a stator, an oscillatory armature movable relative to said coil and stator in response to energization and deenergization of said coil, and a rotor, characterized by an expansible and contractible spring wound on said rotor one end of which is connected to said armature for moving said rotor in step-by-step fashion in response to the movement of the armature, the other end of said spring freely resting upon the periphery of the rotor, and resilient means associated with that end of the spring connected to the armature for maintaining said expansible and contractible spring in tensioned engagement with the armature.

STEPHEN A. DENMAN.

REFERENCES CITED

The following references are of record in the file of this patent:

UNITED STATES PATENTS

| Number | Name | Date |
|---|---|---|
| 401,152 | Geary | Apr. 9, 1889 |
| 1,490,125 | O'Leary | Apr. 15, 1924 |

FOREIGN PATENTS

| Number | Country | Date |
|---|---|---|
| 236,592 | Great Britain | July 6, 1925 |